(12) United States Patent
Vegge et al.

(10) Patent No.: US 7,169,207 B2
(45) Date of Patent: Jan. 30, 2007

(54) DEVICE AND METHOD FOR TREATMENT OF GASES

(75) Inventors: Olaf Trygve Vegge, Kristiansand (NO); Jon Christian Brinch, Oslo (NO)

(73) Assignees: Alcoa Inc., Pittsburgh, PA (US); Elkem ASA (NO)

( * ) Notice: Subject to any disclaimer, the term of this patent is extended or adjusted under 35 U.S.C. 154(b) by 421 days.

(21) Appl. No.: 10/678,339

(22) Filed: Oct. 3, 2003

(65) Prior Publication Data

US 2005/0072267 A1    Apr. 7, 2005

(51) Int. Cl.
*C22B 4/02* (2006.01)
*C22B 4/08* (2006.01)

(52) U.S. Cl. .................. 75/10.27; 75/647; 266/144

(58) Field of Classification Search ............. 75/10.27, 75/647; 266/144
See application file for complete search history.

(56) References Cited

U.S. PATENT DOCUMENTS 1,825,707 A    10/1931  Wagner, Jr.
4,099,957 A    7/1978   Nickell ........................ 71/122
4,099,959 A *  7/1978   Dewing et al. ............ 75/10.27
6,440,193 B1   8/2002   Johansen et al. .......... 75/10.27
6,440,198 B1   8/2002   Yang et al. ................... 95/275
6,530,970 B2   3/2003   Lindstad ..................... 75/10.27

FOREIGN PATENT DOCUMENTS

CA    01185435      4/1985
WO    WO 96/37287   11/1996

* cited by examiner

Primary Examiner—Scott Kastler
(74) Attorney, Agent, or Firm—Greenberg Traurig, LLP

(57) ABSTRACT

The device and method of the present invention employs a column having a gas inlet in its lower part and a gas outlet in its upper part. Carbon particles are introduced into the column through a supply pipe. The supply pipe is movable so that by manipulating the height of the supply pipe in conjunction with discharging particulate matter through the column, the height of the bed of particulate matter in the column can be adjusted so that the retention time of the off gas in the particulate bed is constant. By maintaining a constant retention time of the off gas in the bed, complete conversion of the off gas is achieved.

9 Claims, 2 Drawing Sheets

DEVICE AND METHOD FOR TREATMENT OF GASES

STATEMENT REGARDING FEDERALLY SUPPORTED RESEARCH

The subject matter of this application was made with United States Government support under Contract No. DE-FC07-00ID13900 awarded by the Department of Energy. The United States Government has certain rights to this invention.

FIELD OF THE INVENTION

The present invention relates to a device and a method for the treatment of gases and, more particularly, for the treatment of off gases produced during the carbothermic production of aluminum in an electric smelting reactor.

BACKGROUND OF THE INVENTION

During the carbothermic production of aluminum in electric smelting reactors, the off gases are treated to recover aluminum. Typically, the off gases contain oxides of carbon and considerable amounts of aluminum vapor and aluminum sub-oxides such as $Al_2O$. The aluminum and aluminum compounds in the off gas are typically recovered in a counter-current gas-solid reactor or column wherein particulate carbon matter flows downward while the gas or the off gas flows upward. One example of such a column is taught in U.S. Pat. No. 4,099,959 to Dewing et al. wherein the off gas passes up through a bed of relatively large pieces of carbon that are essentially stationary with respect to one another.

In carbothermic production of aluminum, the operation of the smelting reactor fluctuates over time and, thus, the amount of gas produced as well as the pressure in the reactor fluctuates. The fluctuations in gas production causes fluctuations in gas velocity in the counter-current column, thereby resulting in fluctuations in retention time of the off gases in the column. Where the retention time of the off gas in the column is short, reaction between the off gas and particulate carbon in the column may not be complete. There is a need to maintain the contact time between the off gas and the carbon so that the retention time is maintained at a constant so as to provide uniform reaction between the carbon and the off gas.

SUMMARY OF THE INVENTION

It is the object of the invention to provide a method and device for the treatment of gas and particularly off gas from the carbothermic production of aluminum in an electric smelting reactor wherein the retention time of the off gas in particulate carbon is maintained.

Accordingly, the present invention relates to a device for the treatment of gases and particularly off gases from a reactor for carbothermic production of aluminum, where said device comprises a vertical column having a gas inlet opening in its lower part and a gas outlet opening in its upper part, the column being intended to contain a moving bed of particulate material, said device being characterized in that a vertical supply pipe for particulate matter extends through the top of the column, said pipe being movable in a vertical direction in order to adjust the height of the moving bed of particulate matter and means for discharging particulate material from the column which is arranged below the gas inlet opening.

Broadly, the device of the present invention for the treatment of off gases from a reactor used for carbothermic production of aluminum comprises:
(a) a vertically oriented column having an upper part and a lower part;
(b) a gas inlet opening positioned in the lower part of said column;
(c) a gas outlet opening positioned in the upper part of said column;
(d) a vertical supply pipe in said upper part of said column for introducing a downward flow of particulate material into said column, said supply pipe being vertically movable; and
(e) a particulate discharge means positioned in said lower part of said column.

Preferably, the gas inlet opening is arranged to provide gas tangentially to the lower part of the column. Suitably, the gas inlet opening is located in a side wall in the lower part of the column. In an alternative embodiment, the gas inlet opening is located in the bottom wall of the column.

The gas outlet opening is preferably positioned in a side wall of the upper part of the column.

The particulate discharge means can be a rotary oriented valve positioned in the bottom wall of the column and operated in a conventional manner to allow the discharge of particulate matter to the bottom of the column. Alternatively, the discharge means can be made up of a rotary disc which is horizontally oriented in the lower part of the column. The disc has a diameter which is less than the inner diameter of the lower part of the column so that it can rotate freely within the column. A discharge opening is positioned in the bottom wall of the column and allows for particulate material which is spun off of the disc when the disc is rotated to pass down and through the discharge opening. The gas inlet opening can be the particulate discharge opening when the discharge means is a rotary disc.

Preferably, the upper part of the column is cylindrical in shape while the lower part of the column is conical in shape.

It is also preferred that the upper cylindrical part of the column extends down into the lower conical part of the column.

In the device of the present invention, the height of the bed of particulate material can be adjusted to correspond to the smelting reactor operating conditions. This is done by moving the supply pipe up or down so as to increase or decrease the height of the bed of particulate matter in the column. In order to decrease or remove particulate matter from the column, the discharge means is used to drain the particulate matter from the column. Thus, the retention time of gas in the bed of particulate material can be kept within a narrow range in order to optimize treatment of the gas. In the case of treating off gas from a reactor for carbothermic production of aluminum, the retention time of the gas in the bed of the carbon particles can be adjusted in order to ensure that all of the aluminum components that are in the off gas have reacted or condensed within the carbon material before the gas leaves the column through the gas outlet opening.

Broadly, the method for treating the off gas from a carbothermic aluminum producing reactor comprises:
(a) introducing particulate carbon in an upper part of a column;
(b) forming a height adjustable bed of said particulate carbon in said column;
(c) introducing off gas into a lower part of said column such that said off gas flows up through said bed of particulate carbon;

(d) discharging particulate carbon material through a lower part of said column; and (e) adjusting the height of said bed of particulate carbon to maintain a retention time of said off gas in said bed of particulate carbon.

As noted above, in order to increase the height of the bed of the particulate carbon matter, more particulate carbon matter is introduced into the column by raising the vertical supply pipe. In order to decrease the height of the bed of the particulate carbon matter, the discharge means discharges particulate carbon matter from the column and the vertical supply pipe is lowered.

DETAILED DESCRIPTION OF PREFERRED EMBODIMENTS

Figure 1:
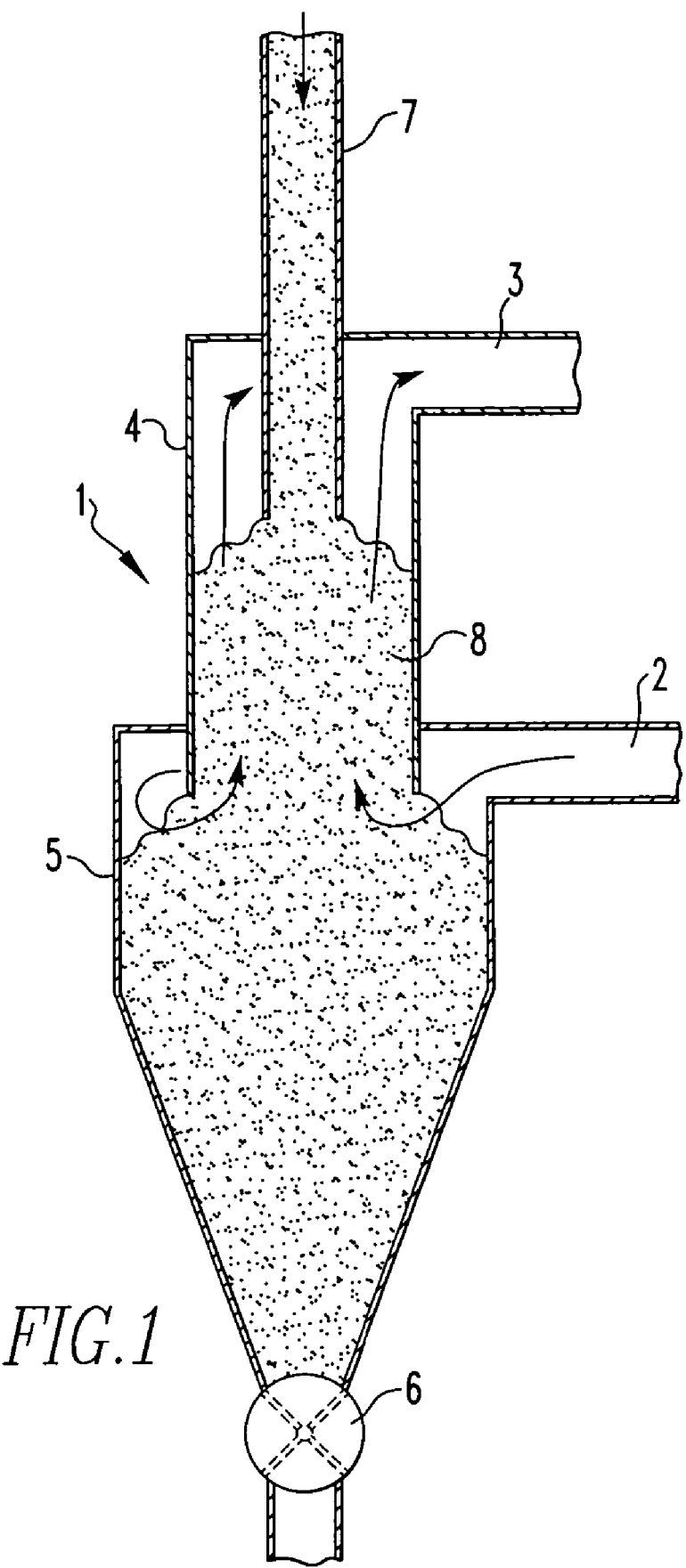
FIG. 1 is a cross-section taken vertically through an embodiment of the device according to the present invention.

As shown in FIG. 1, the device of the present invention includes a vertical column 1 having a gas inlet opening 2 and a gas outlet opening 3. Column 1 is made up of an upper part 4 and a lower part 5. As shown in FIG. 1, upper part 4 has a generally cylindrical shape while lower part 5 has a generally conical shape. The lower end of upper part 4 extends a distance into lower part 5. Lower part 5 has a greater diameter at its top than the lower portion of upper part 4.

Gas inlet opening 2 is arranged in a side wall of lower part 5 so that the off gas enters through the bottom of upper part 4. By arranging the gas inlet opening 2 in the side wall of lower part 5, the off gas travels tangentially to column 1.

Discharge means 6 for particulate matter is arranged in the bottom wall of lower part 5 of column 1. In FIG. 1, discharge means is shown as a conventional rotary valve in the bottom wall of the column 1. Such a valve includes a motor to allow it to be rotated and for material to be discharged during rotation of the valve. Particulate matter discharged through the rotary valve either flows downwardly into a receiver (not shown) or is returned to the column 1 through the supply pipe 7 for further processing.

Vertical supply pipe 7 is inserted into column 1 through the top wall of column 1. Pipe 7 can be moved in a vertical manner using conventional lifting and lowering means (not shown). Particulate matter such as carbon particles are supplied to the column through pipe 7 in order to create bed 8 of the particles in column 1. The feeding of particulate matter into pipe 7 is done in a conventional manner using conventional equipment.

Figure 2:
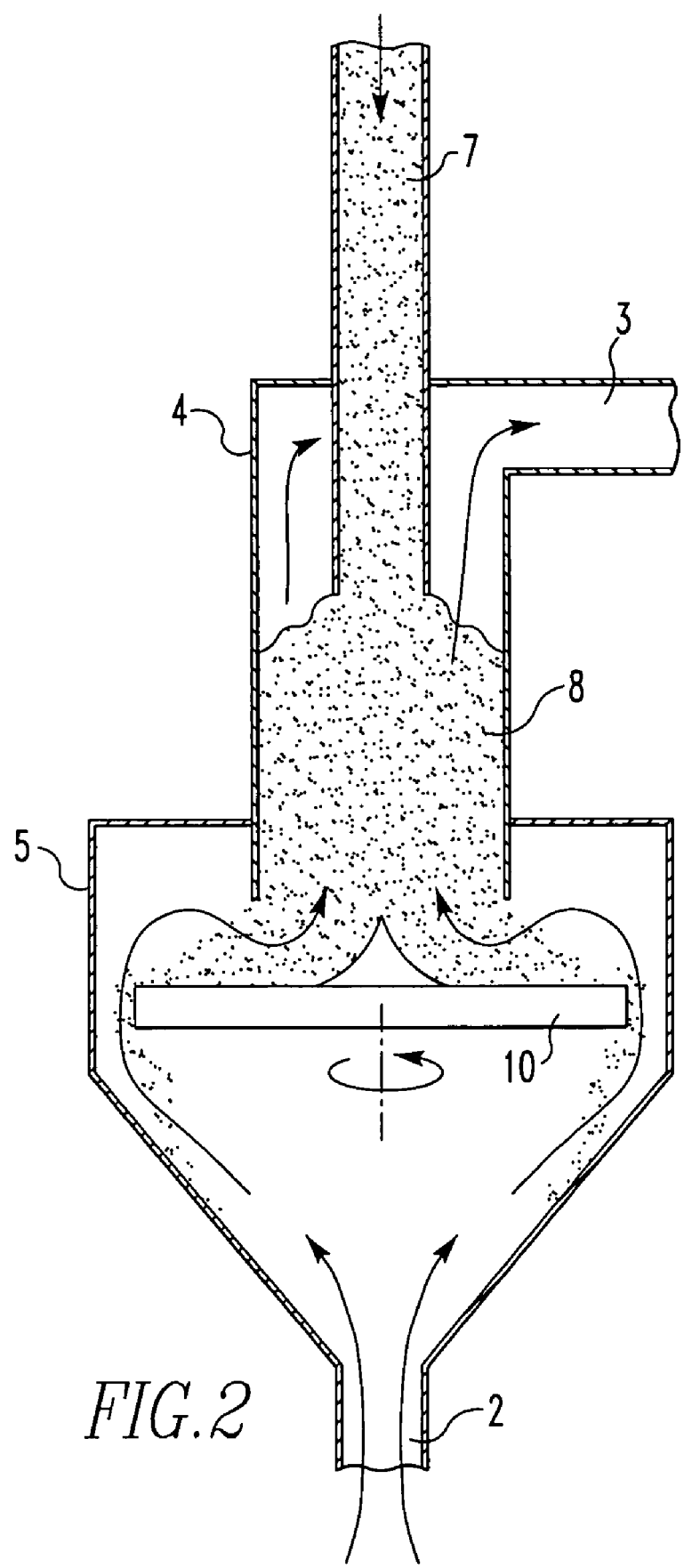
FIG. 2 is a vertical cross-section taken through another embodiment of the device according to the present invention.

In FIG. 2, an alternative embodiment of the device of the present invention is shown. In FIG. 2, like components are given identical reference numerals. In FIG. 2, gas inlet opening 2 is arranged in the bottom wall of lower part 5 of column 1. The discharge means in FIG. 2 comprises both the gas inlet opening 2 and a rotary disc 10. When rotary disc 10 rotates, particulate matter falls off the edges of the disc and flows down through opening 2. As shown in FIG. 2, disc 10 has a diameter that is smaller than the inner diameter of lower part 5 but greater than the diameter of upper part 4. By having a diameter greater than upper part 4, particulate matter sits and fills the lower portion of upper part 4. Particulate matter is supplied through supply pipe 7 down onto disc 10, thereby creating a bed 8. The arrangement of disc 10 in lower part 5 is done in a conventional manner using conventional means to rotate and support disc 10 in lower part 5.

The embodiment of the device shown in FIG. 2 is particularly suited to be located directly above the furnace roof to facilitate the more direct route for reactor gases to leave the reactor and enter into the device of the present invention, and for discharging particulate matter directly from the opening 2 and into the reactor.

In operation of the device of the present invention, gas is supplied to the device through gas inlet opening 2. The gas is suitably off gas from a smelting reactor for the carbothermic production of aluminum. The off gas for such a smelting reactor contains oxides of carbon as well as aluminum vapors and volatile aluminum sub-oxides. The gas enters the column and moves upward through bed 8 of the carbon particles where the aluminum components in the off gas react with the carbon particles to form aluminum carbide. The oxides of carbon then continue to travel upward through bed 8 and out through the gas outlet opening 3.

Based on the pressure of the gas entering gas inlet opening 2, the height of bed 8 can be adjusted by lowering and lifting pipe 7 of upper part 4 and by discharging particulate matter through the bottom of lower part 5. In this way, the retention time of the gas in bed 8 can be kept approximately constant even if the pressure of the gas varies. Thus, the height of bed 8 is regulated such that the retention time of the gas in the particles is maintained to allow for complete conversion of the aluminum suboxide to aluminum carbide.

It will be understood that the claims are intended to cover all changes and modifications of the preferred embodiments of the invention herein chosen for the purpose of illustration which do not constitute a departure from the spirit and scope of the invention.

Having described the presently preferred embodiments, it is to be understood that the invention may be otherwise embodied within the scope of the appended claims.

What is claimed is:

1. A method for treating off gas from a carbothermic aluminum producing reaction comprising:

(a) introducing particulate carbon in an upper part of a column;

(b) forming a height adjustable bed of said particulate carbon in said column;

(c) introducing off gas into a lower part of said column such that said off gas flows up through said bed of particulate carbon;

(d) discharging particulate carbon material through a lower part of said column; and (e) adjusting the height of said bed of particulate carbon to maintain an approximately constant retention time of said off gas in said particulate carbon independent of the amount of pressure of the off gas supplied.

2. The method of claim 1 further comprising increasing the height of said bed of particulate carbon by introducing more particulate carbon into said column.

3. The method of claim 1 further comprising decreasing the height of said bed of particulate carbon by discharging particulate carbon from said column.

4. The method of claim 1 wherein said off gas is introduced tangentially into the lower part of said column.

5. The method of claim 1, wherein said adjusting step comprises:
   moving a supply pipe interconnected to said column.
6. The method of claim 5, wherein said moving step comprises:
   vertically adjusting the height of said supply pipe relative to said column.
7. The method of claim 1, wherein said introducing off gas step comprises:
   introducing said off gas from a furnace roof of an aluminum smelting reactor.
8. The method of claim 7, wherein said column is located above said furnace roof.
9. The method of claim 7, wherein said discharging step comprises:
   discharging said particulate carbon matter directly from said lower part of said column into said aluminum smelting reactor.

* * * * *